(12) United States Patent
Blaney et al.

(10) Patent No.: US 11,400,624 B2
(45) Date of Patent: Aug. 2, 2022

(54) CONSTANT CROSS SECTION MANDREL FOR CMC COMPONENTS

(71) Applicant: RAYTHEON TECHNOLOGIES CORPORATION, Farmington, CT (US)

(72) Inventors: Ken F. Blaney, Middleton, NH (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 122 days.

(21) Appl. No.: 16/139,141

(22) Filed: Sep. 24, 2018

(65) Prior Publication Data

US 2020/0094447 A1    Mar. 26, 2020

(51) Int. Cl.
| | |
|---|---|
| *F01D 9/04* | (2006.01) |
| *B29C 43/36* | (2006.01) |
| *F01D 9/06* | (2006.01) |
| *F01D 11/08* | (2006.01) |
| *B29L 31/00* | (2006.01) |

(52) U.S. Cl.
CPC ............. *B29C 43/361* (2013.01); *F01D 9/04* (2013.01); *F01D 9/06* (2013.01); *F01D 11/08* (2013.01); *B29C 2043/3626* (2013.01); *B29C 2043/3665* (2013.01); *B29L 2031/7504* (2013.01);
(Continued)

(58) Field of Classification Search
CPC ......... B29C 53/60; B21B 17/02; B21B 17/08; B21B 17/14; B21B 19/06
See application file for complete search history.

(56) References Cited

U.S. PATENT DOCUMENTS 1,284,363 A * 11/1918 Kempton ................. B31C 1/00
                                                    156/184
2,902,080 A *  9/1959 Fuchs, Jr. .............. B21D 11/14
                                                    72/299
(Continued)

FOREIGN PATENT DOCUMENTS

DE          10044626         3/2002
DE          10044626 A1 *    3/2002  ........... B29C 33/485
(Continued)

OTHER PUBLICATIONS

Extended EP Search Report for EP Application No. 19199359.1 dated Jun. 17, 2020.
(Continued)

*Primary Examiner* — Joseph S Del Sole
*Assistant Examiner* — Margaret B Hayes
(74) *Attorney, Agent, or Firm* — Carlson, Gaskey & Olds, P.C.

(57) ABSTRACT

A mandrel for a molding process that includes a first portion that has a first portion outer surface, a first portion inner surface, a first portion first end, and a first portion second end. A thickness of the first portion first end is greater than the first portion second end. A second portion has a second portion outer surface, a second portion inner surface, a second portion first end, and a second portion second end. A thickness of the second portion first end is smaller than the second portion second end. The first portion inner surface engages the second portion inner surface to form a mandrel that has a constant cross-section.

20 Claims, 10 Drawing Sheets

(52) U.S. Cl.
CPC .. *F05D 2240/11* (2013.01); *F05D 2300/6033* (2013.01); *F05D 2300/614* (2013.01)

(56) References Cited

U.S. PATENT DOCUMENTS

| | | | | |
|---|---|---|---|---|
| 4,541,605 | A * | 9/1985 | Kubota | B29C 45/4421 249/142 |
| 4,591,400 | A * | 5/1986 | Fradenburgh | B29C 33/48 156/80 |
| 7,153,125 | B2 * | 12/2006 | Evans | F16L 43/008 425/441 |
| 7,479,302 | B2 * | 1/2009 | Steffier | B23P 15/008 427/248.1 |
| 9,150,948 | B2 | 10/2015 | Dambrine et al. | |
| 2003/0075338 | A1 * | 4/2003 | Sivley, IV | E21B 43/105 166/207 |
| 2004/0104575 | A1 * | 6/2004 | Ellington | F16L 13/147 285/333 |
| 2007/0024053 | A1 * | 2/2007 | Sivley | E21B 43/106 29/523 |
| 2007/0277971 | A1 * | 12/2007 | Garcia | E21B 43/105 166/212 |
| 2009/0152770 | A1 * | 6/2009 | Mikac | B29C 45/4421 264/334 |
| 2010/0323051 | A1 * | 12/2010 | Helenius | B29C 33/76 425/161 |
| 2013/0181374 | A1 * | 7/2013 | Ender | B29D 99/0014 264/258 |
| 2015/0224693 | A1 * | 8/2015 | Jaussaud | B29C 45/36 425/577 |
| 2017/0138208 | A1 | 5/2017 | Hillier | |
| 2017/0313389 | A1 * | 11/2017 | von Eberstein | B63B 35/44 |
| 2018/0236694 | A1 * | 8/2018 | Eisch | B29C 53/824 |

FOREIGN PATENT DOCUMENTS

| | | | |
|---|---|---|---|
| FR | 2177518 | 11/1973 | |
| GB | 2135236 | 8/1984 | |
| WO | 20170071852 | 5/2017 | |
| WO | WO-2017071852 A2 * | 5/2017 | ........... B29C 33/444 |

OTHER PUBLICATIONS

Partial EP Search Report for EP Application No. 19199359.1 dated Feb. 18, 2020.

* cited by examiner

CONSTANT CROSS SECTION MANDREL FOR CMC COMPONENTS

BACKGROUND

This application relates to a mandrel having a constant cross-section for forming components from ceramic matrix composites.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

Some known methods of forming blade outer air seals of ceramic matrix composite fiber layers use a mandrel.

SUMMARY

In one exemplary embodiment, a mandrel for a molding process that includes a first portion that has a first portion outer surface, a first portion inner surface, a first portion first end, and a first portion second end. A thickness of the first portion first end is greater than the first portion second end. A second portion has a second portion outer surface, a second portion inner surface, a second portion first end, and a second portion second end. A thickness of the second portion first end is smaller than the second portion second end. The first portion inner surface engages the second portion inner surface to form a mandrel that has a constant cross-section.

In a further embodiment of any of the above, a first protrusion has a first dovetail surface that extends from the first portion inner surface. A second protrusion has a second dovetail surface that extends from the second portion inner surface. The first and second dovetail surfaces abut one another.

In a further embodiment of any of the above, a channel is formed between the first and second portions and extends along a length of the mandrel.

In a further embodiment of any of the above, a locking pin is inserted into an end of the channel.

In a further embodiment of any of the above, the locking pin is configured to contact the first and second portions and maintain a gap between the first and second portions along the length of the mandrel.

In a further embodiment of any of the above, a second locking pin is inserted into a second end of the channel.

In a further embodiment of any of the above, the end of the channel and the second end of the channel each have an angled surface for engagement with the locking pin and second locking pin.

In a further embodiment of any of the above, a locking wedge is inserted into an end of the channel and configured to maintain a gap between the first and second portions along the length of the mandrel.

In a further embodiment of any of the above, the first and second portions are formed from graphite.

In another exemplary embodiment, a molding apparatus includes a fixture that has a first member and a second member that extend from a base. The first member has a groove and the second member has a fixture pin. A mandrel has a first portion and a second portion. Each of the first and second portion has a dovetail mating surface. The mandrel has first and second locking pins. The mandrel is secured to the fixture by the groove at the first member and by the fixture pin at the second member.

In a further embodiment of any of the above, the fixture pin contacts the second locking pin.

In a further embodiment of any of the above, a space is formed between the mandrel and the base and is configured to receive ceramic matrix composite material when a component is formed about the mandrel.

In a further embodiment of any of the above, the mandrel is configured to provide an inner mold surface and the base is configured to provide an outer mold surface for forming a component.

In a further embodiment of any of the above, the mandrel is formed from graphite.

In another exemplary embodiment, a method of forming a matrix composite component includes providing a mandrel that has a first portion and a second portion. The first portion includes a first dovetail surface in engagement with a second dovetail surface of the second portion. A locking pin is inserted into an end of the mandrel. A matrix composite laminate is wrapped about the mandrel to form a component. The locking pin is removed. The first portion is removed from a first end of the component and the second portion is removed from a second end of the component.

In a further embodiment of any of the above, the inserting the locking pin comprises forming and maintaining a gap between a first portion inner surface and a second portion inner surface.

In a further embodiment of any of the above, the matrix composite laminate is densified before removing the locking pin.

In a further embodiment of any of the above, the mandrel is mounted to a fixture before the wrapping of the matrix composite laminate.

In a further embodiment of any of the above, the mandrel provides an inner mold surface and the fixture provides an outer mold surface for the matrix composite laminate.

In a further embodiment of any of the above, the component is a blade outer air seal.

These and other features may be best understood from the following drawings and specification.

DETAILED DESCRIPTION

Figure 1:
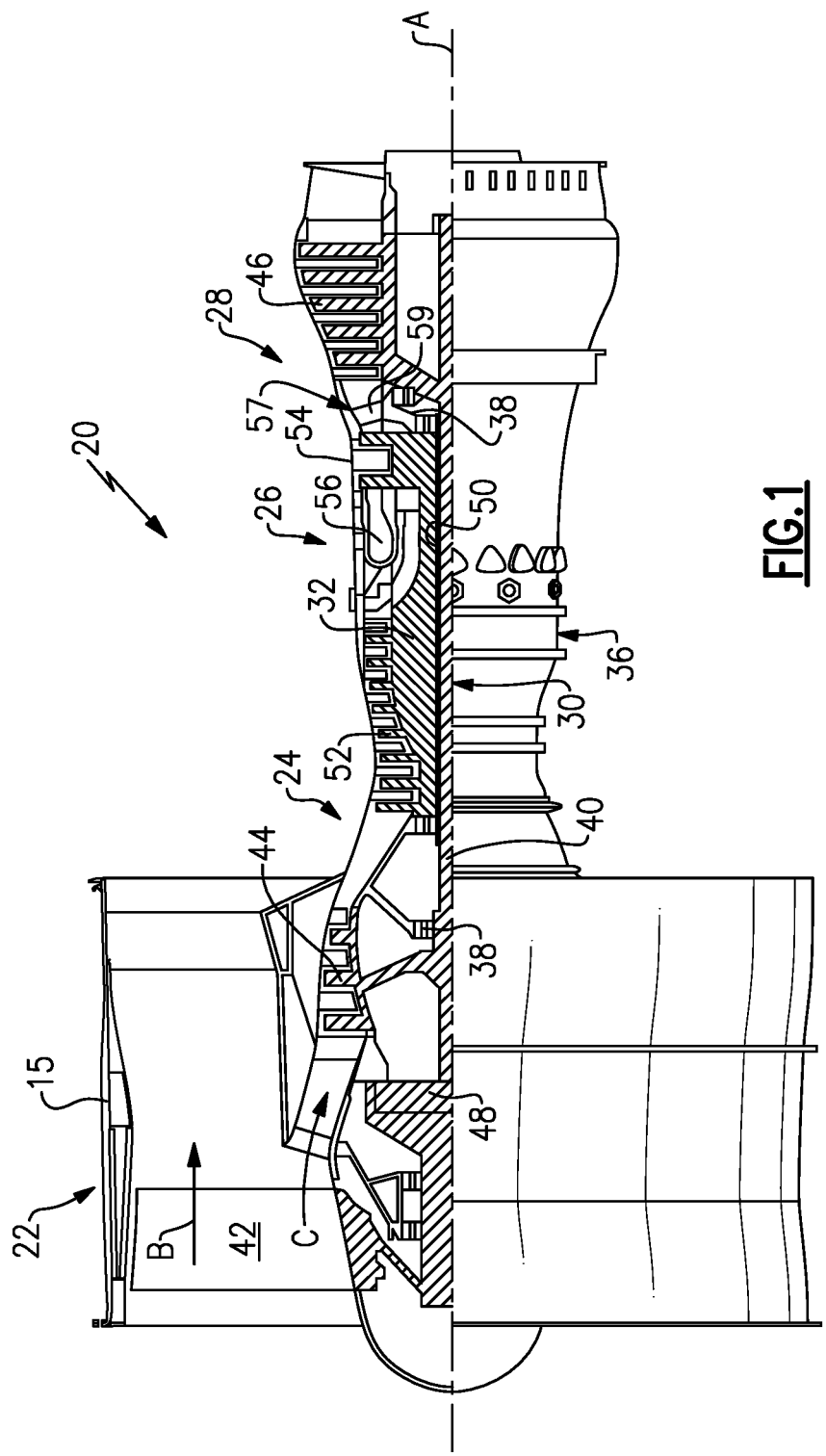
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
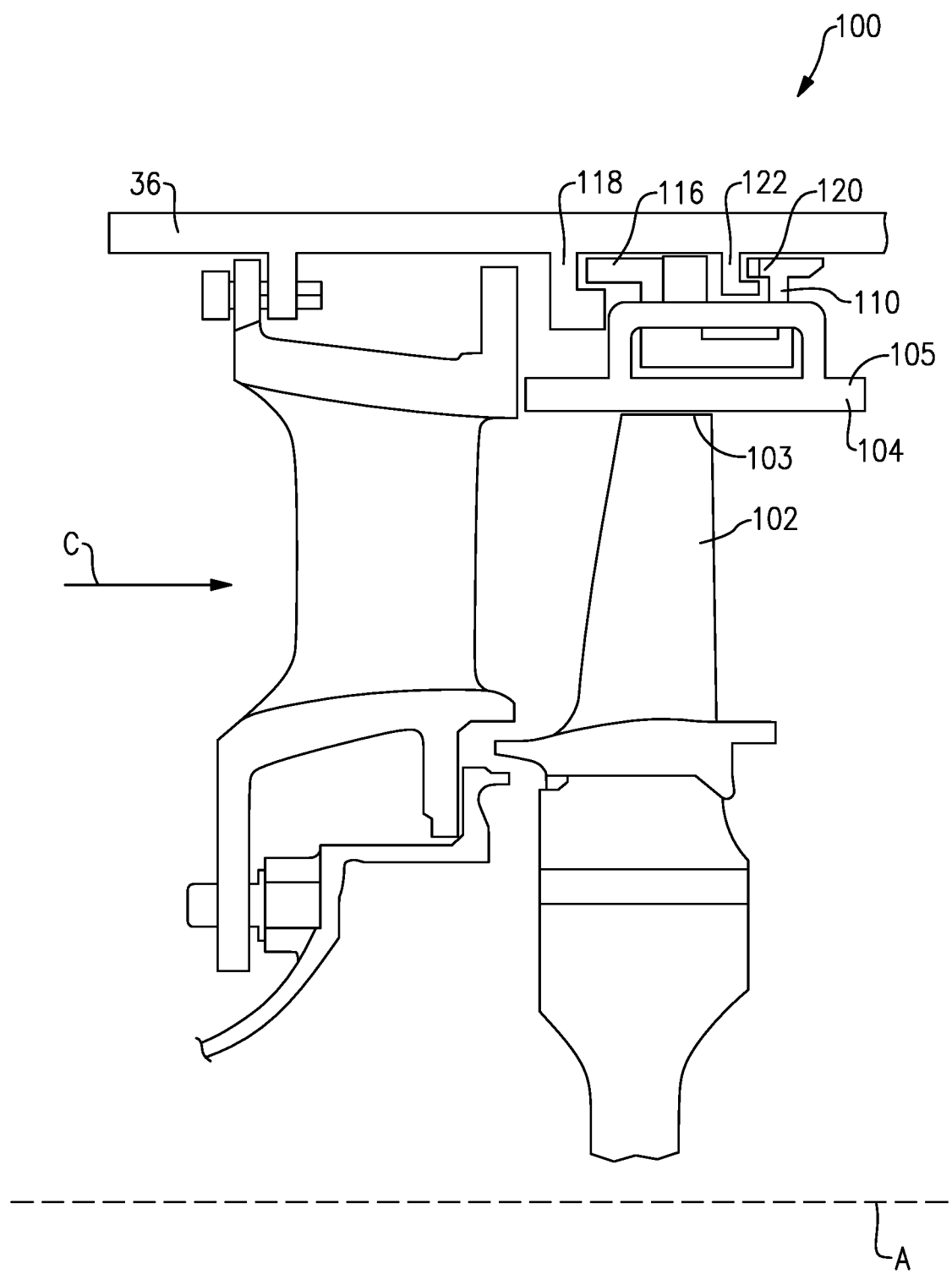
FIG. 2 shows a turbine section.

FIG. 2 shows a portion of a turbine section 100, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure.

A turbine blade 102 has a radially outer tip 103 that is spaced from a blade outer air seal ("BOAS") 104. The BOAS 104 may be made up of a plurality of seal segments 105 that are circumferentially arranged in an annulus about the central axis A of the engine 20. The BOAS seal segments 105 may be monolithic bodies that are formed of a high thermal-resistance, low-toughness material, such as a ceramic matrix composite ("CMC").

The BOAS 104 may be mounted to an engine case or structure, such as engine static structure 36 via an attachment block 110. The engine structure 36 may extend for a full 360° about the engine axis A. The engine structure 36 may have a forward hook 118 supporting a forward hook 116 of the attachment block 110. The engine structure 36 may have an aft hook 122 supporting an aft hook 120 on the attachment block 110. In the illustrated embodiment, engine structure hooks 118, 122 face rearwardly, while the attachment block hooks 116, 120 face forwardly. It should be understood, however, that the arrangement of some or all of the hooks 118, 120, 116, and 118 could be reversed such that hooks 118 and/or 122 face forwardly and hooks 116 and/or 120 face rearwardly. In one aspect of this disclosure, the hooks 116 and 120 face in a common axial direction and the hooks 118 and 122 face in an opposed axial direction.

Figure 3A:
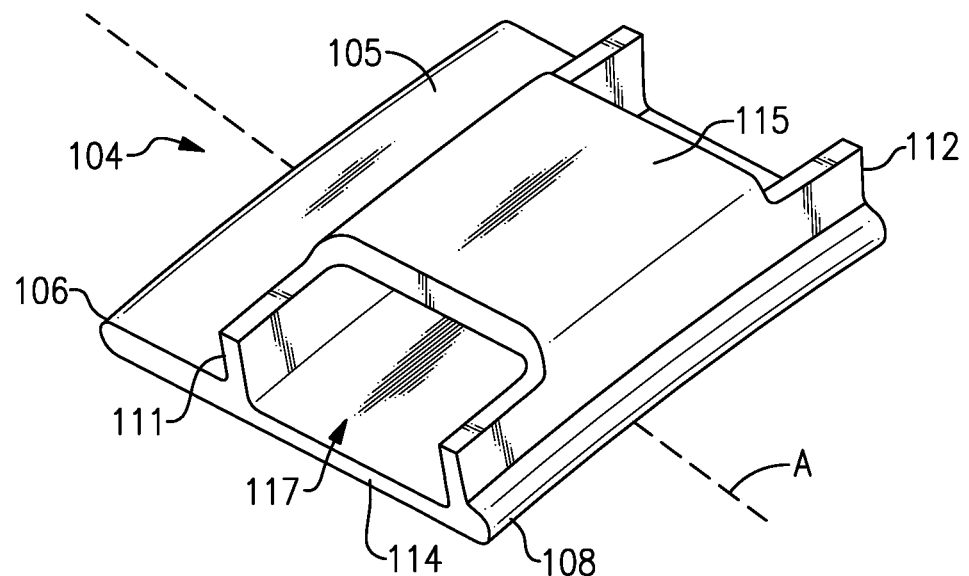
FIG. 3A shows an exemplary blade outer air seal.
Figure 3B:
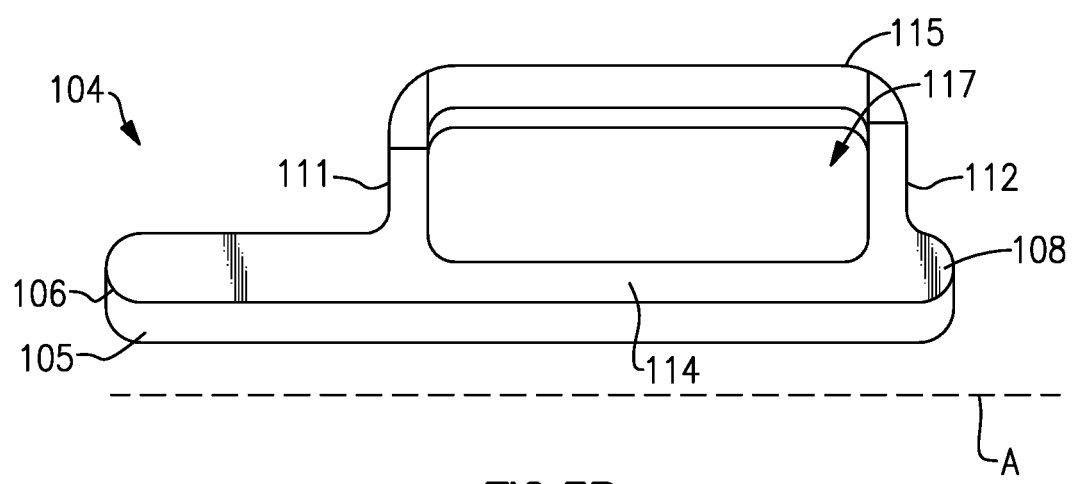
FIG. 3B shows a cross-section of a blade outer air seal.

FIGS. 3A and 3B show an exemplary BOAS seal segment 105 of a BOAS 104. The BOAS seal segment 105 includes a leading edge 106 and a trailing edge 108. The BOAS segment 105 includes a forward wall 111 and an aft wall 112 that extend radially outward from a base portion 114 to an outer wall 115. The base portion 114 extends between the leading edge 106 and the trailing edge 108 and defines a gas path on a radially inner side and a non-gas path on a radially outer side. The outer wall 115 includes a generally constant thickness and constant position in the radial direction such that an outer surface of the outer wall 115 is planar. The forward wall 111, the aft wall 112, the outer wall 115, and the base portion 114 define a passage 117 for attachment to the attachment block 110 (shown in FIG. 2). In this disclosure, forward, aft, upstream, downstream, axial, radial, or circumferential is in relation to the engine axis A unless stated otherwise.

The BOAS 104 is formed of a ceramic matrix composite ("CMC") material. The BOAS 104 is formed of a plurality of CMC laminates. The laminates may be silicon carbide fibers, formed into a woven fabric in each layer. The fibers may be coated by a boron nitride.

CMC components such as a BOAS 104 are formed by laying fiber material, such as laminate sheets, in tooling, injecting a liquid resin into the tooling, and curing to form a solid composite component. The component may be densified by adding additional material to further stiffen the laminates. In some more complex components, pre-formed parts are further provided within the tooling before material is put into the tooling. For example, a mandrel may be used to occupy a cavity in the component to prevent material from flowing into the cavity.

FIGS. 4A-4D show a two-piece mandrel 300 according to an embodiment. The mandrel 300 has a tapered first portion 302 and a tapered second portion 304. The first portion 302 has an outer surface 306 and an inner surface 308. The second portion 304 has an outer surface 310 and an inner surface 312. In an embodiment, each of the outer and inner surfaces 306, 310, 308, 312 is a radial surface. The outer surfaces 306, 310 are parallel to one another, and the inner surfaces 308, 312 are parallel to one another. The inner surfaces 308, 312 are offset relative to the outer surfaces 310, 312. That is, an axis of revolution of the outer surfaces 306, 310 is offset from an axis of revolution of the inner surfaces 308, 312. In one example, this offset may be approximated as an angle between a tangent of the inner surfaces 308, 312 and a tangent of the outer surfaces 306, 310 of between 1 and 10°. The first portion 302 and second portion 304 are opposing radial wedges. The offset axes of the radial inner and outer surfaces results in different heights at each end of each portion. The mandrel 300 has a first end 303 and a second end 305. The first portion 302 has a first height $H_1$ at the first end 303 and a second height $H_2$ at the second end 305. The second portion 304 is flipped, meaning it has the first height $H_1$ at the second end 305 and the second height $H_2$ at the first end 303. In one embodiment, a difference between the first height $H_1$ and the second height $H_2$ is between about 0.005 inches (0.127 mm) and 0.100 inches (2.54 mm). In a further embodiment, the difference in height between the first height $H_1$ and the second height $H_2$ is about 0.020 inches (0.508 mm). The outer surfaces 306, 310 are shaped depending on the component they are used to form.

Figure 4A:
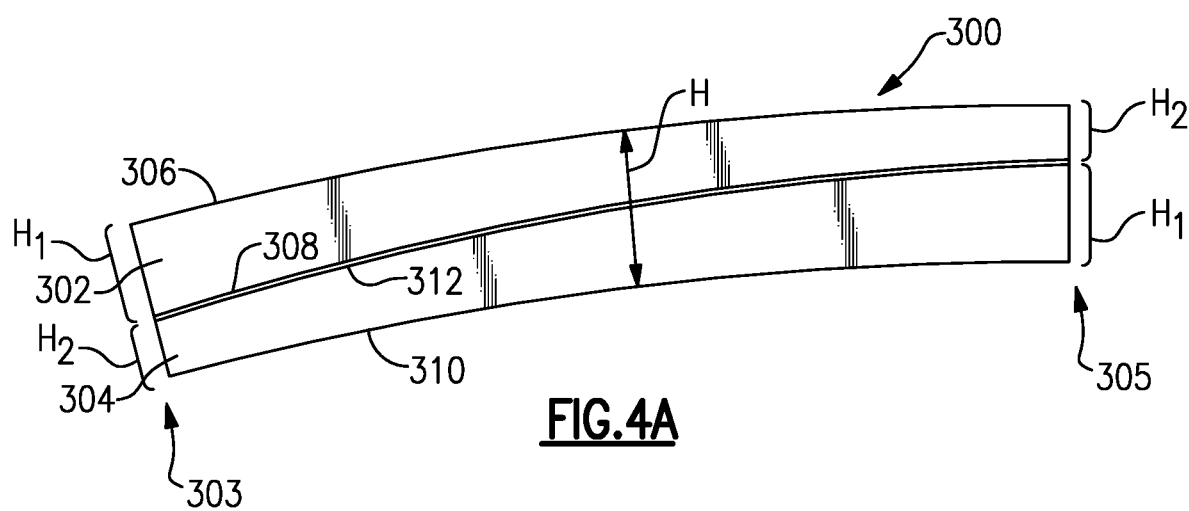
FIG. 4A shows an exemplary mandrel in a retracted state.
Figure 4B:
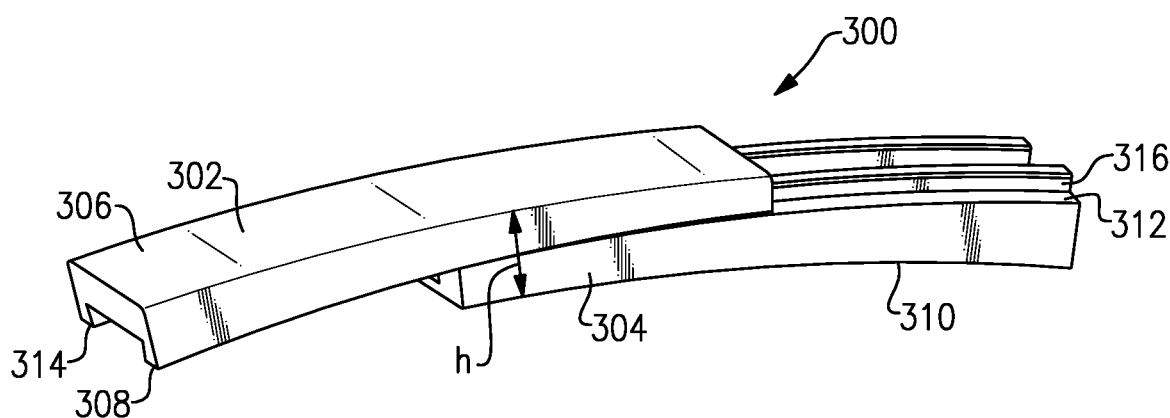
FIG. 4B shows an exemplary mandrel in an expanded state.

When the first and second portions 302, 304 are in a retracted state, as shown in FIG. 4A, the mandrel 300 has a constant cross section along the length. The mandrel 300 has a height H along the entire length. When the first and second portions 302, 304 are in an expanded state, as shown in FIG. 4B, a height h is smaller than the height H. This smaller height h when the first and second portions 302, 304 are in the retracted state facilitates easy removal of the mandrel 300 from the component. The first and second portions 302 cannot slide beyond one another past the retracted state.

As shown in FIG. 4B, the inner surfaces 308, 312 slide relative to one another. The first and second portions 302, 304 each include dovetail surfaces 314, 316 along inner surfaces 308, 312, respectively. In other words, each of the first and second portions 302, 304 includes a pair of projections with at least one angled surface. As shown more clearly in FIGS. 4C-4D, the first portion 302 includes a pair of projections 318 along outside edges, with the dovetail surfaces 314 facing inward, or towards one another. The second portion 304 includes a pair of projections 320 inward of the outside edge, with the dovetail surfaces 316 facing outward, or away from one another. The pair of projections 320 fits inward of the pair of projections 318, while dovetail surfaces 314, 316 contact one another. Although a pair of projections on each portion is illustrated, a single projection may fall within the scope of this disclosure.

In use, the CMC component is formed around the mandrel 300, then the first and second portions 302, 304 are slid out opposing ends of the component. The opposing radial wedge shape of the first and second portions 302, 304 allows for a mandrel that is easier to remove, because it avoids being locked into the part. The first and second portions 302, 304 cannot slide past center in order to have a constant cross section. The dovetail surfaces provide self-centering of the first and second portions when locked for a more precisely controlled tool. Thus, the dovetail surfaces may produce a CMC part with more precisely controlled wall thicknesses.

Figure 4C:
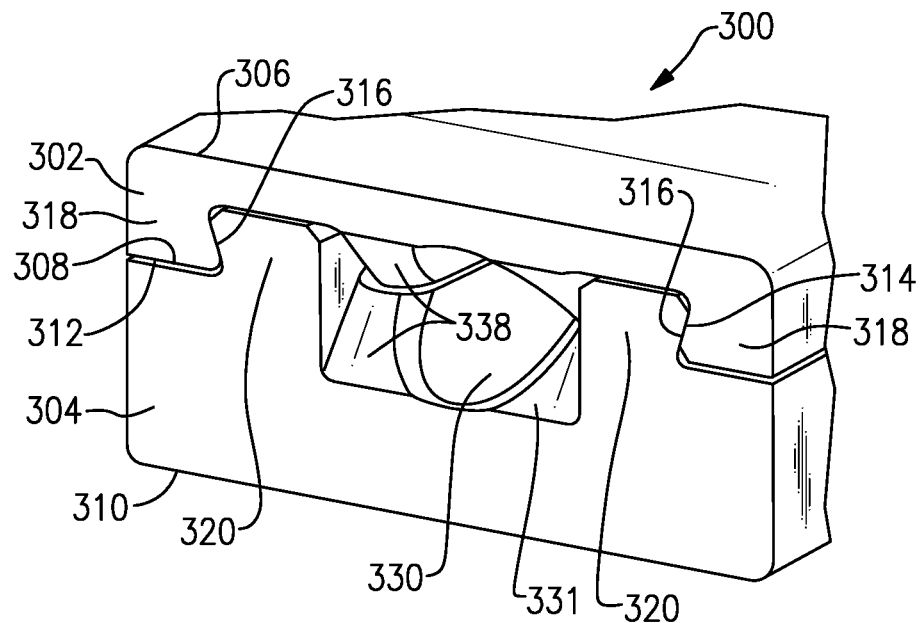
FIG. 4C shows an exemplary mandrel.
Figure 4D:
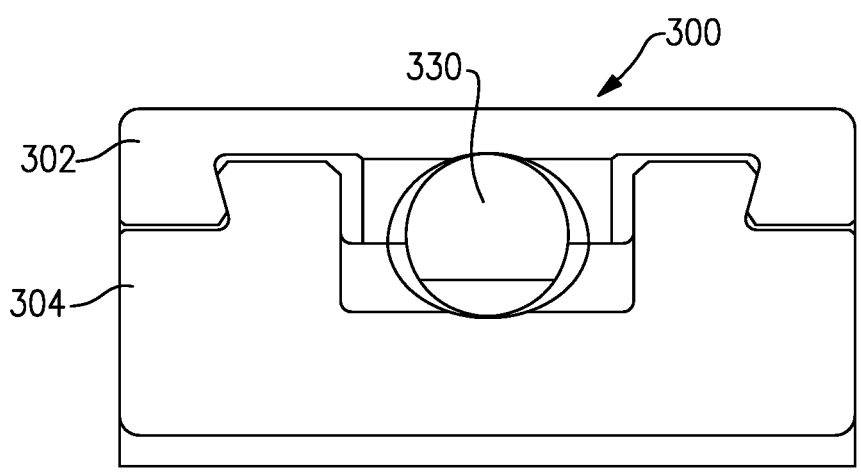
FIG. 4D shows a cross-section of an exemplary mandrel.

As shown in FIGS. 4C-4D, the mandrel 300 includes a channel 330. The ends of the mandrel 300 include a clearance hole 331 and angled surfaces 338. In the illustrated embodiment, the channel 330 is generally circular in cross section, and the clearance hole 331 is generally rectangular. However other shapes of the channel 330 and clearance hole 331 may be contemplated within the scope of this disclosure.

Figure 5A:
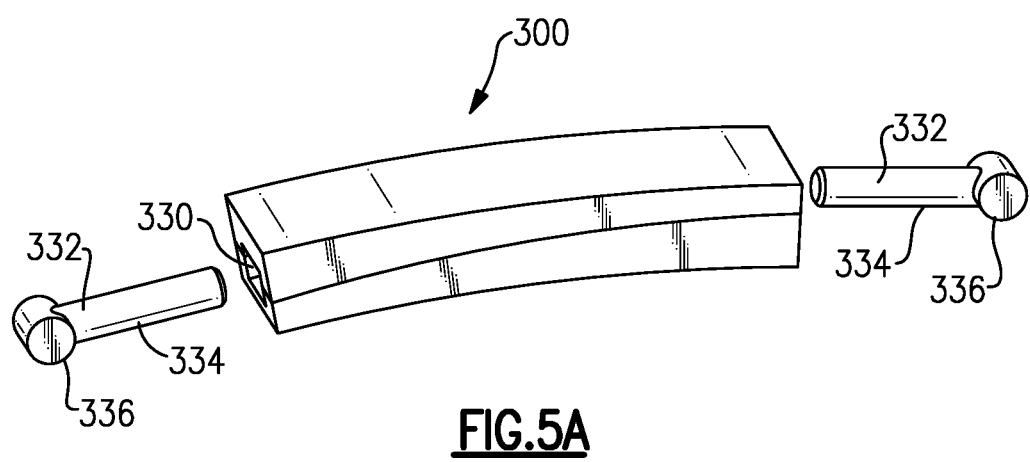
FIG. 5A shows an exploded view of an exemplary mandrel.
Figure 5B:
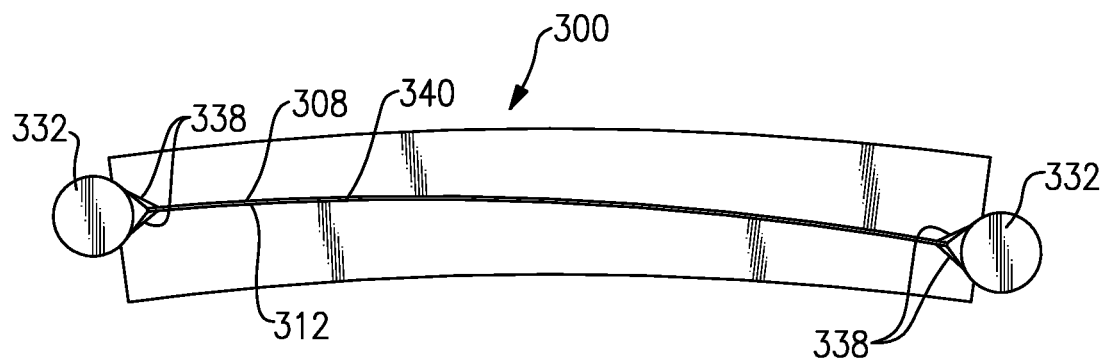
FIG. 5B shows a cross-section of an exemplary mandrel.

The channel 330 receives a locking pin 332, as shown in FIGS. 5A and 5B. The locking pin 332 may be inserted into the channel 330 from either or both ends of the mandrel 300 when the mandrel 300 is in the retracted state. As shown, two locking pins 332 may be used with the mandrel 300. The locking pin 332 includes an elongate body 334 and a tab 336. The tab 336 improves handling during use. In an embodiment, the elongate body 334 is generally cylindrical. In other embodiments, the elongate body 334 is generally rectangular or another shape. The elongate body 334 is shaped to fit into the channel 330, and the tabs 336 fit into the clearance hole 331.

FIG. 5B shows the pins 332 inserted into the channel 330. The first and second portions 302, 304 may have angled surfaces 338 adjacent the channel 330. These angled surfaces 338 engage with the tab 336 to force the first and second portions 302, 304 away from one another. In some examples, when the pin 332 is inserted, a small gap 340 is formed between the inner surfaces 308, 312. The dovetail surfaces 314, 316 keep the first and second portions 302, 304 together while the pin 332 is inserted. The locking pins 332 are self-centering due to the dovetail surfaces 314, 316. When the locking pins 332 are in place, the first and second portions 302, 304 are expanded outward, bringing the mandrel 300 to its maximum height. This makes the mandrel 300 easier to remove once the pin 332 is removed.

The mandrel design does not require any threaded parts, making it easier to construct. For example, the mandrel may be formed from graphite for use in high temperature furnaces.

Figure 6A:
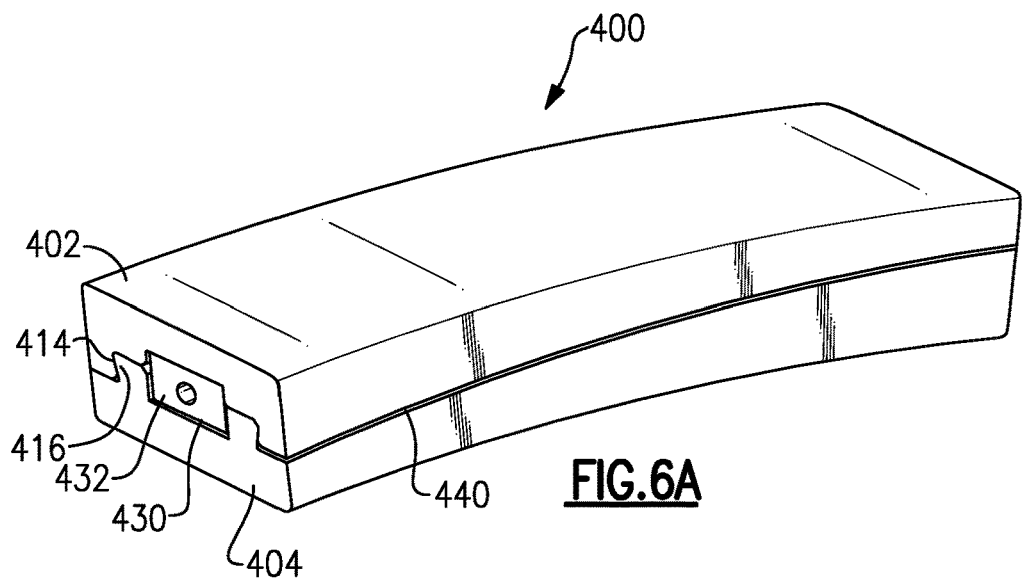
FIG. 6A shows another exemplary mandrel.
Figure 6B:
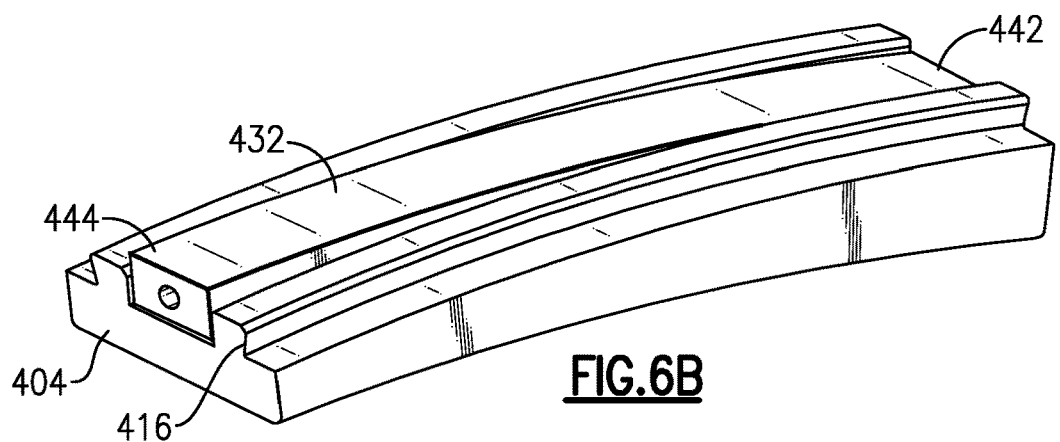
FIG. 6B shows a portion of another exemplary mandrel.
Figure 6C:
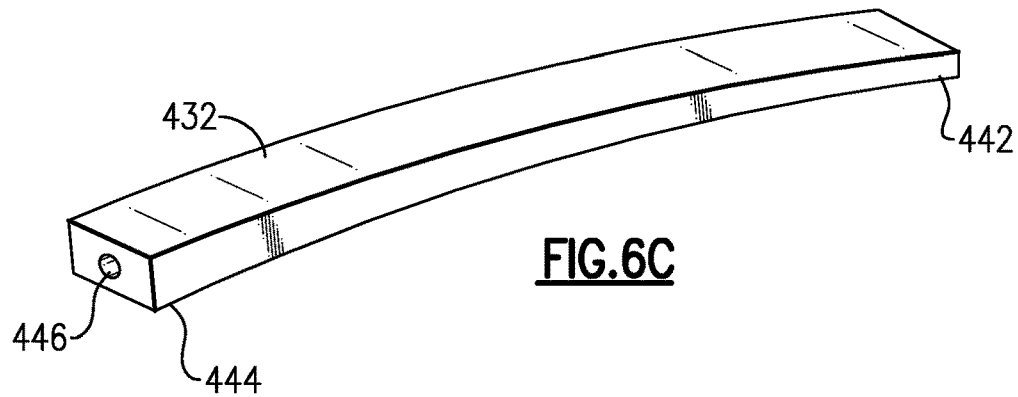
FIG. 6C shows an exemplary locking wedge.

FIGS. 6A-6C show an alternate configuration utilizing a wedge style locking feature in place of the locking pin 332. In this embodiment, the mandrel 400 has a rectangular channel 430. A locking wedge 432 is inserted into the channel 430 to force the dovetail surfaces 414, 416 into engagement and form the gap 440. The locking wedge 432 extends the full length of the mandrel 400. The locking wedge 432 is tapered, such that it has a smaller thickness at a first end 442 than at a second end 444. The locking wedge 432 is inserted into the mandrel 400 with the first end 442 first. As the locking wedge 432 is pushed further into the channel 430 and the thickness of the locking wedge 432 increases, the first and second portions 402, 404 are forced apart. After the component is formed, the locking wedge 432 may be removed by pushing on the first end 442 or by pulling on the second end 444. The second end 444 may include a puller feature 446 to aid in pulling the locking wedge 432 from the channel 430.

Figure 7A:
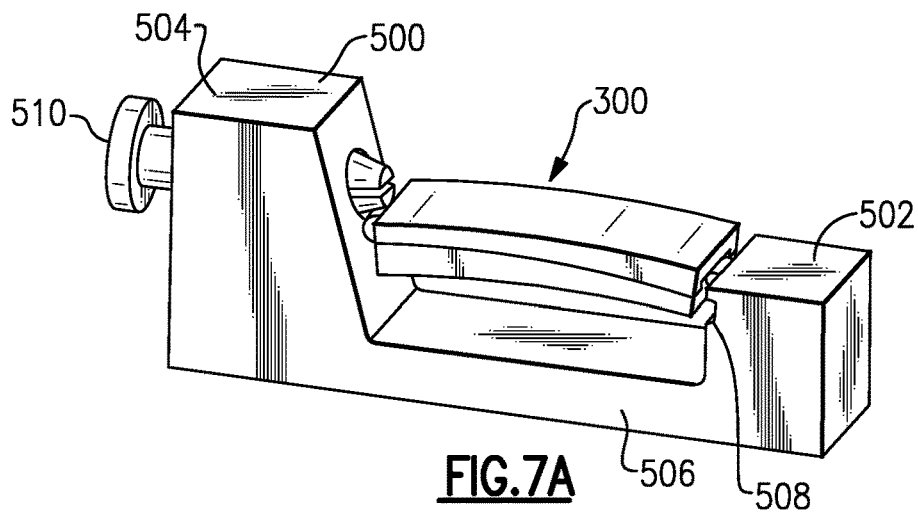
FIG. 7A shows an exemplary fixture.
Figure 7B:
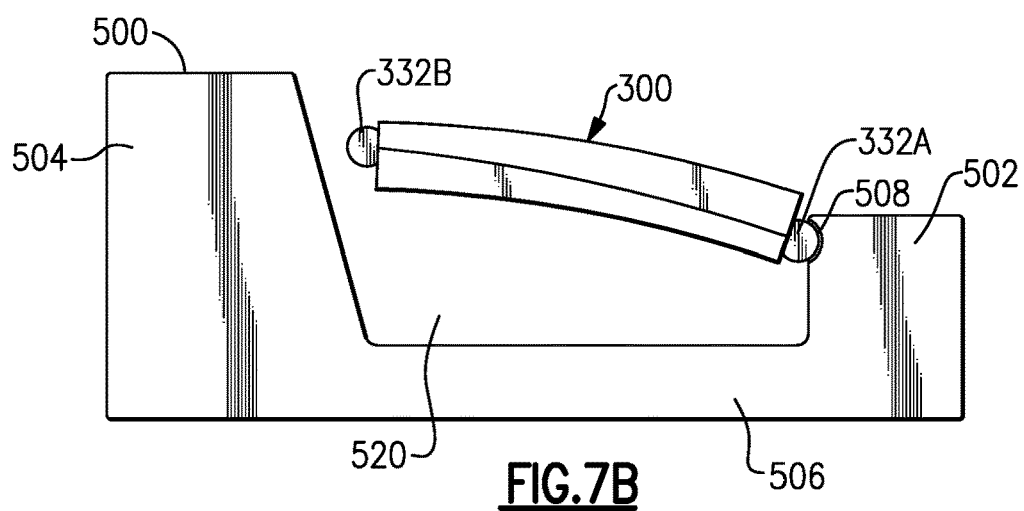
FIG. 7B shows an exemplary fixture.
Figure 7C:
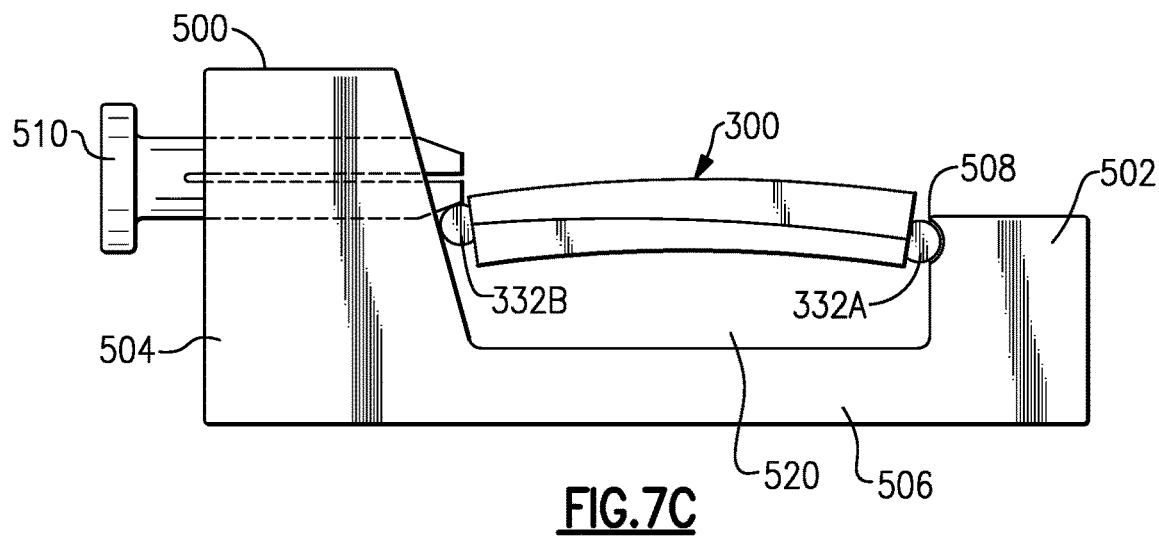
FIG. 7C shows an exemplary fixture.

FIGS. 7A-7C show a molding fixture that uses the mandrel 300. The mandrel 300 is mounted in a fixture 500. The fixture 500 has a first member 502 and a second member 504 extending from a base 506. The first member 502 includes a groove 508. The mandrel 300 with locking pins 332 inserted is mounted on the fixture 500. One of the pins 332A fits into the groove 508 and is maintained in place by the groove 508. The mandrel 300 is rotated about the pin 332A in the groove 508 such that the other pin 332B contacts the second member 504. A fixture locking pin 510 is inserted into the second member 504 to maintain the mandrel 300 in place. The fixture locking pin 510 is engaged with the locking pin 332B. The fixture locking pin 510 is held in place by a combination of friction and spring force.

This mounting arrangement of the mandrel 300 in the fixture 500 provides clearance about the mandrel 300 to form the CMC plies of the component to be formed. In some embodiments, the base 506 provides the outer mold line for the component. In such embodiments, the entire gap 520 between the mandrel 300 and base 506 will be filled with CMC plies to form the component. Once the component is formed, the mandrel 300 is removed from the fixture 500 by removing the fixture locking pin 510.

Figure 8A:
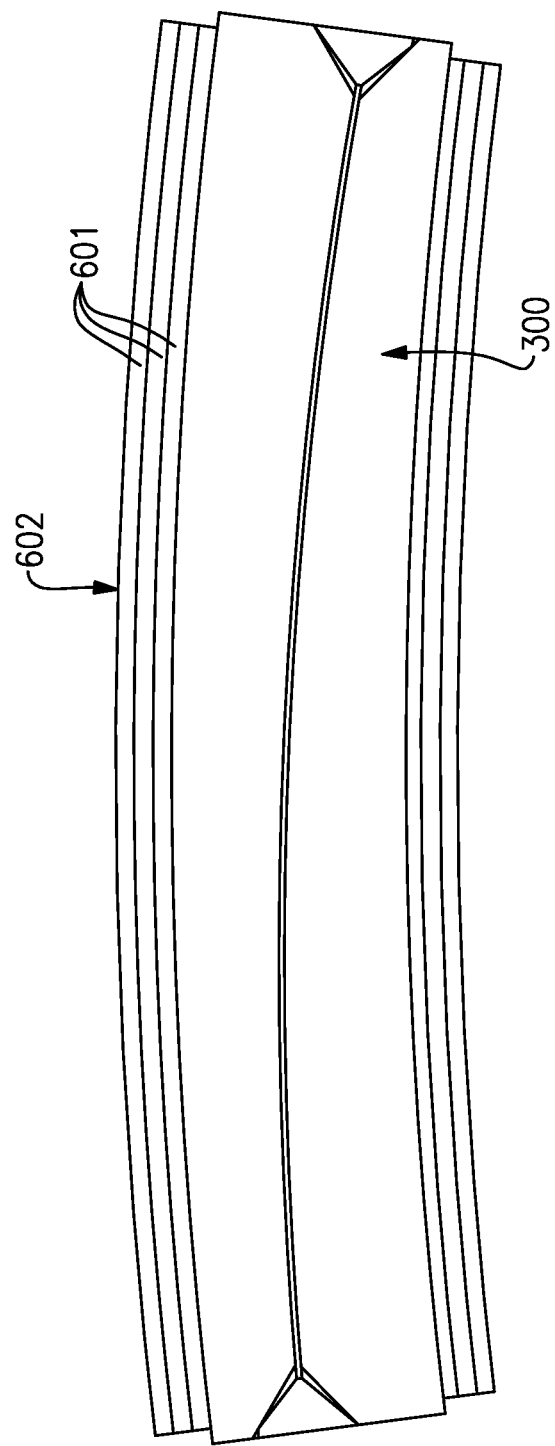
FIG. 8A shows an exemplary mandrel and component.
Figure 8B:
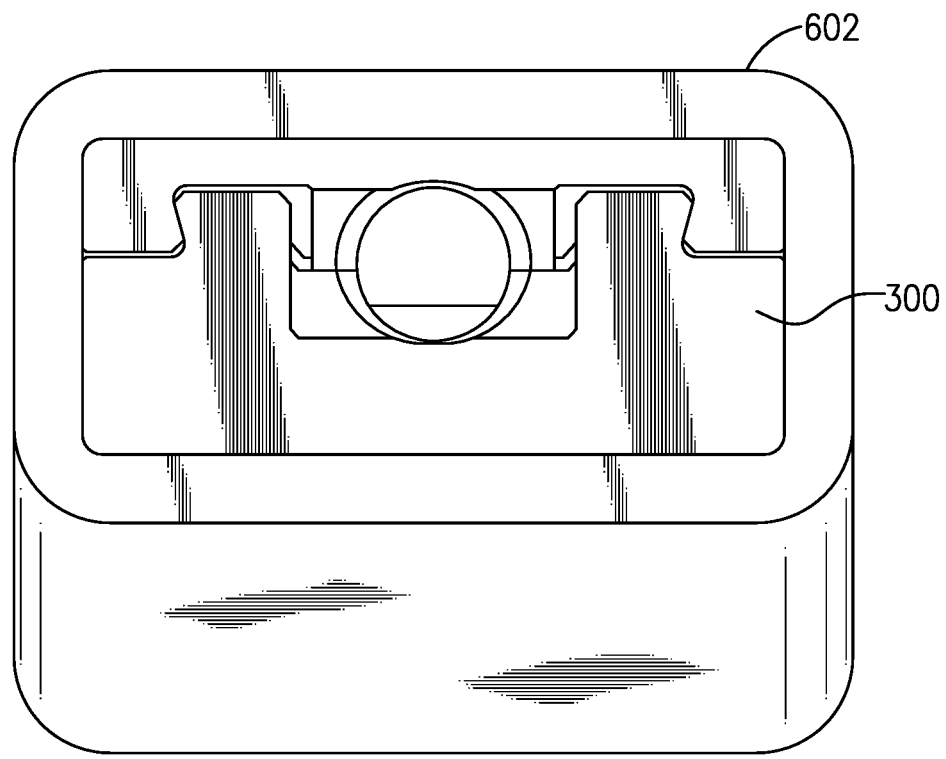
FIG. 8B shows an exemplary mandrel and component.

A method of forming a CMC component includes the steps of providing a mandrel 300 having first and second portions 302, 304 in a retracted state and inserting locking pins 332 into the ends of the mandrel 300 to lock the first and second portions in the retracted state. The mandrel may be mounted to a fixture 500. A plurality of CMC laminate layers 601 are wrapped about the mandrel 300, as shown in FIGS. 8A-8B. After the CMC laminates 601 are wrapped about the mandrel 300, they are solidified into a component 602. In some embodiments, this includes injecting a resin into the fibers. The CMC laminates 601 may be silicon carbide fibers, formed into a woven fabric in each layer. The fibers may be coated by a boron nitride.

In some examples, the component is densified. Densification generally includes adding additional material to make the CMC laminates more stiff than their free woven fiber state. The densification process increases the density of the laminate material after assembly. A filler material, such as a silicon carbide matrix material, is injected into the spaces between the fibers in the woven layers.

One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% may be difficult to achieve in practice. The desired amount of densification depends on the particular application.

After the component 602 is formed and solidified, the mandrel 300 and component 602 are removed from the fixture 500. The first and second portions 302, 304 of the mandrel 300 are moved to the expanded state. The component 602 is removed from the mandrel 300. The component may be a BOAS seal segment 105 (shown in FIGS. 3A-3B), for example. The mandrel 300 may be used to form a CMC material, or may be used to form other matrix composite components, such as organic matrix composite ("OMC") or polymer matrix composite ("PMC") components.

Known mandrels require the component to have a taper to allow the mandrel to be pulled from the part once the curing process is complete. However, such tapers may make the components more complicated. For example, backside sealing of BOAS faces may be more difficult with a tapered surface. The two-piece mandrel allows for a constant fully enclosed cross-section with no taper to be produced in a matrix composite plied component. The constant cross-section may further provide a stronger, more continuous ply construction and reduce the chance of having wrinkles or voids in the plies. The cross-section may also reduce any non-laminated zones, noodles, matrix, or chopped strands. The mandrel may further provide a more uniform hot wall thickness in thermal parts, such as a BOAS. The self-centering pins and dovetail surfaces ensure repeatable results in the manufacturing process. Although a rectangular cross-section mandrel is illustrated, the cross-section could be tubular or another shape.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A mandrel for a molding process, the mandrel comprising:
   a first portion including a first wedge-shaped body having a first portion outer surface, a first portion inner surface, a first portion first end, and a first portion second end, wherein the first portion includes a first protrusion having a first dovetail surface that extends from the first portion inner surface, and wherein a thickness of the first portion first end is greater than the first portion second end;
   a second portion including a second wedge-shaped body having a second portion outer surface, a second portion inner surface, a second portion first end, and a second portion second end, wherein the second portion includes a second protrusion having a second dovetail surface that extends from the second portion inner surface, and wherein a thickness of the second portion first end is smaller than the second portion second end; and
   wherein the first portion inner surface engages the second portion inner surface with the first portion first end arranged adjacent to the second portion first end and the first portion second end arranged adjacent to the second portion second end to form the mandrel having a constant cross-section and such that the first and second dovetail surfaces abut one another, wherein a channel is formed between the first and second portions, extending along a length of the mandrel, and a locking pin is inserted into an end of the channel, wherein the locking pin has an elongate body and a tab, and wherein the elongate body is shaped to fit into the channel, and the elongate body is cylindrical.

2. The mandrel of claim 1, wherein the locking pin is configured to contact the first and second portions and maintain a gap between the first and second portions along the length of the mandrel.

3. The mandrel of claim 2, wherein the locking pin urges the first and second portions away from each other to establish the gap in response to insertion of the locking pin into the end of the channel.

4. The mandrel of claim 3, wherein:
the first portion includes a first pair of projections that extend along a length of the first portion from the first portion first end to the first portion second end, the first pair of projections comprising a respective instance of the first dovetail surface;
the second portion includes a second pair of projections that extend along a length of the second portion from the second portion first end to the second portion second end, the second pair of projections comprising a respective instance of the second dovetail surface; and
the first pair of projections mate with the second pair of projections to secure the first portion and the second portion to each other.

5. The mandrel of claim 4, wherein the locking pin is situated between the first pair of projections and is situated between the second pair of projections in response to insertion of the locking pin into the end of the channel.

6. The mandrel of claim 5, wherein the channel extends along a longitudinal axis of the mandrel between the first pair of projections and between the second pair of projections.

7. The mandrel of claim 1, wherein a second locking pin is inserted into a second end of the channel.

8. The mandrel of claim 7, wherein the end of the channel and the second end of the channel each have an angled surface for engagement with the locking pin and second locking pin.

9. The mandrel of claim 1, wherein the first and second portions are formed from graphite.

10. A molding apparatus, comprising:
a fixture having a first member and a second member extending from a base, the first member having a groove and the second member having a fixture pin;
a mandrel having a first portion and a second portion, the first portion including a first wedge-shaped body having a first dovetail mating surface, the second portion including a second wedge-shaped body having a second dovetail mating surface, the first and second dovetail mating surfaces engage one another, and the mandrel having first and second locking pins;
wherein the mandrel is secured to the fixture by the groove at the first member and by the fixture pin at the second member and wherein the mandrel is configured to provide an inner mold surface and the base is configured to provide an outer mold surface for forming a component; and
wherein a channel is formed between the first and second portions such that the channel extends along a length of the mandrel.

11. The molding apparatus of claim 10, wherein the fixture pin contacts the second locking pin.

12. The molding apparatus of claim 10, wherein a space is formed between the mandrel and the base configured to receive composite material when a component is formed about the mandrel.

13. The molding apparatus of claim 12, wherein the entire space is configured to be filled with composite material when a component is formed about the mandrel.

14. The molding apparatus of claim 10, wherein the mandrel is formed from graphite.

15. The molding apparatus of claim 10, wherein the first and second locking pins are configured to contact the first and second portions and maintain a gap between the first and second portions along a length of the mandrel.

16. The molding apparatus of claim 10, wherein at least one of the first and second locking pins has an elongate body and a tab, and wherein the elongate body is shaped to fit into the channel, and the elongate body is cylindrical.

17. The molding apparatus of claim 10, wherein at least one of the first and second locking pins has an elongate body and a tab, and wherein the elongate body is shaped to fit into the channel, and wherein a clearance hole is formed in the first and second portions at an end of the channel, and the tab fits into the clearance hole.

18. The molding apparatus of claim 17, wherein:
wherein the first and second locking pins are configured to contact the first and second portions and maintain a gap between the first and second portions along the length of the mandrel; and
each of the first and second locking pins includes a respective instance of the elongate body and the tab, the first and locking pins urge the first and second portions away from each other to establish the gap in response to insertion of the first and second locking pins into the respective end of the channel.

19. A mandrel for a molding process, the mandrel comprising:
a first portion including a first wedge-shaped body having a first portion outer surface, a first portion inner surface, a first portion first end, and a first portion second end, wherein the first portion includes a first protrusion having a first dovetail surface that extends from the first portion inner surface, and wherein a thickness of the first portion first end is greater than the first portion second end;
a second portion including a second wedge-shaped body having a second portion outer surface, a second portion inner surface, a second portion first end, and a second portion second end, the second portion includes a second protrusion having a second dovetail surface that extends from the second portion inner surface, and wherein a thickness of the second portion first end is smaller than the second portion second end; and
wherein the first portion inner surface engages the second portion inner surface with the first portion first end arranged adjacent to the second portion first end and the first portion second end arranged adjacent to the second portion second end to form the mandrel having a constant cross-section and such that the first and second dovetail surfaces abut one another, wherein a channel is formed between the first and second portions, extending along a length of the mandrel, and a locking pin is inserted into an end of the channel, wherein the locking pin has an elongate body and a tab, and wherein the elongate body is shaped to fit into the channel, and wherein a clearance hole is formed in the first and second portions at an end of the channel, and the tab fits into the clearance hole.

20. The mandrel of claim 19, wherein the elongate body is cylindrical.

* * * * *